Feb. 7, 1939. C. R. PARKER 2,145,992
FISHING DEVICE
Original Filed June 15, 1937
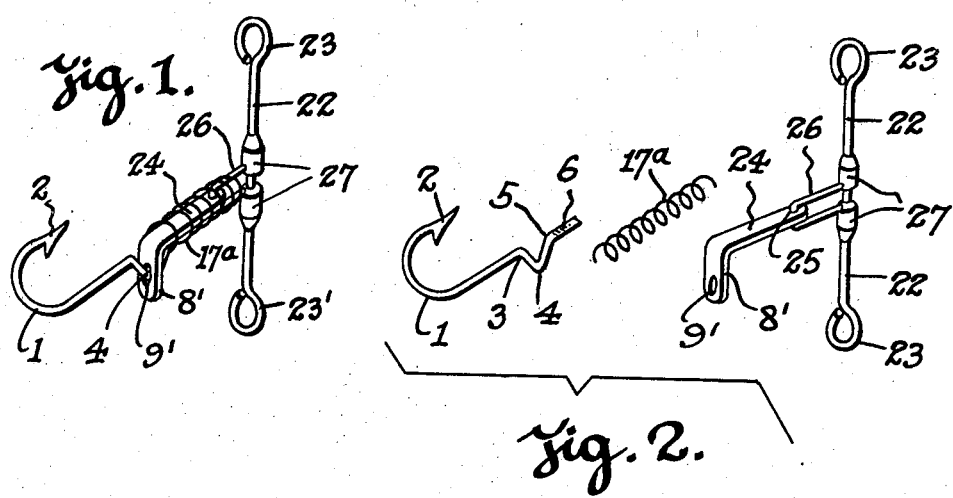
Fig. 1.
Fig. 2.
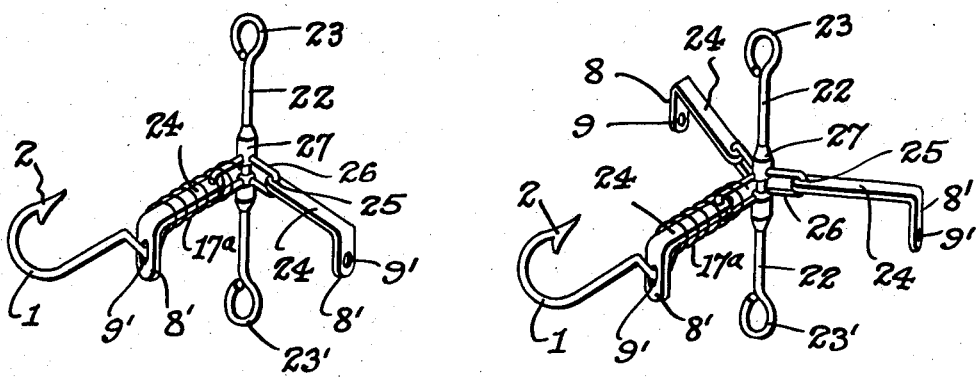
Fig. 3.
Fig. 4.
Colin R. Parker, Inventor
By Lester R. Sargent
Attorney Patented Feb. 7, 1939

2,145,992

UNITED STATES PATENT OFFICE 2,145,992

FISHING DEVICE

Colin R. Parker, Newport, R. I.

Original application June 15, 1937, Serial No. 148,397. Divided and this application November 20, 1937, Serial No. 175,704

6 Claims. (Cl. 43—28)

This application is a division of my application Serial 148,397, filed June 15, 1937, now Patent No. 2,128,315 of August 30, 1938.

The object of my invention is to provide a novel fish hook which can be readily detached from a line for the purpose of releasing the fish from the hook more easily and in a more humane manner than in withdrawing the barbed end of the hook forcibly as in the usual manner.

It is also an object of my invention to provide a modification in which two or more hooks are used.

I attain these and other objects of my invention by the mechanism illustrated in the accompanying drawing, in which—

Figure 1 is a perspective view of the invention including a member to which a sinker may be attached;

Fig. 2 is a perspective view similar to Fig. 1 but with the hook and spring detached;

Fig. 3 is a perspective view of a modification of my invention carrying two hooks; and Fig. 4 is a perspective view of another modification of my invention carrying three hooks.

Like characters of reference designate like parts in each of the several views.

Referring to the accompanying drawing, I provide a fish hook 1 having the usual barb 2 but having the shank bent at 3 to form a V-shaped outward bend 4, the shank again being bent at 5 and terminating in the shank end 6.

I provide a wire 22 terminating at the upper end in a loop 23 and at the lower end with a loop 23' and having spaced bosses or hub members 27 at or near its central portion. Affixed to the hub members or bosses 27 is a U-shaped wire 26 on which is mounted a plate 24, the wire 26 passing through the aperture 25 in plate 24, thus allowing free movement of plate 24 in all directions. A coil spring 17a encircles the plate 24 and the U-shaped wire 26. It also detachably engages the shank 6 of fish hook 1. The plate 24 has a bent end 8' with an aperture 9' through which the shank 6 and V-shaped bend 4 of the hook are removably inserted, as shown in the drawing. When it is desired to disengage the hook, the spring 17a may be compressed so as to free it of engagement with the shank of the hook.

In this form of the invention the hook is held in the proper position to hook the fish in the upper part of the mouth when the line is pulled up. The hook is held in position in relation to the center piece which prevents the fish from swallowing the hook, as is often the case with the single hook fastened to the line.

Referring to Fig. 3 there is illustrated a modification of the invention in which two U-shaped wires 26 and two plates 24 are provided for detachably holding two hooks 1 in a manner similar to that shown and described in detail in Fig. 1 which holds but one hook.

In Fig. 4 there is illustrated a modification of the invention in which three U-shaped wires 26 are provided and also three of the hook-holding plates 24 to detachably carry three hooks 1.

It is also in the contemplation of my invention to increase the number of members 26 and 24 and hooks 1 if additional hooks on a single line are desired.

To operate the device, the fisherman after he catches the fish, pushes the spring 17a toward the wire 22 which disengages spring 17a from the shank end 6 of the fish hook and permits the bent portion 4 of the hook to be withdrawn through aperture 9' of bent end 8' of plate 24, thereby making it possible to withdraw the hook point first from the fish, and making it unnecessary to forcibly withdraw the hook and barb in the usual manner. The result is a saving of time and patience of the fisherman, and it also involves a more humane treatment of the fish. The wire 22 prevents the fish from swallowing the hook.

What I claim is:

1. In a fishing device, the combination of a strand of wire having a loop at each end, bosses on its central portion, a U-shaped wire having its ends affixed to said bosses and extending at right angles to the wire, a fish hook, and an L-shaped plate having an aperture at one end by which it is swingably mounted on the aforesaid U-shaped wire, said plate also having an apertured bent end to detachably receive the shank of the fish hook, and a coil spring encircling the plate and shank of the fish hook, the fish hook having a V-shaped bend in its shank, substantially as shown.

2. In a fishing device, the combination of a strand of wire having a loop at each end, bosses on its central portion, a plurality of U-shaped wires having their ends affixed to said bosses and extending at right angles to the wire, a plurality of hooks, a plurality of L-shaped plates having apertures at the ends by which they are swingably mounted on the aforesaid U-shaped wires, said plates also having apertures in the other ends to detachably receive the shanks of the fish hooks, and coil springs encircling the plates and shanks of the fish hooks.

3. In a fishing device, the combination of a strand of wire having a loop at each end, bosses on its central portion, a U-shaped wire having its ends affixed to said bosses and extending at right angles to the wire, an L-shaped plate having an aperture at the end by which it is swingably mounted on the aforesaid U-shaped wire, said plate also having an apertured bent end to detachably receive a fish hook, a coil of wire encircling the plate and detachably engaging the shank of the fish hook, and a fish hook detachably mounted in said apertured plate, the fish hook having a bend in its shank.

4. In a fishing device, the combination of a strand of wire having a loop at each end, bosses on its central portion, a plurality of U-shaped wires having their ends affixed to said bosses and extending at right angles to the first mentioned wire, a plurality of L-shaped plates having apertures at the ends by which they are swingably mounted on the aforesaid U-shaped wires, said plates also having apertures in the bent ends to detachably receive fish hooks, a coil spring encircling each of the plates and detachably engageable around the shank of a fish hook, and a plurality of fish hooks detachably mounted in said apertured plates, the fish hooks having bends in their shanks and having shanks of substantially cylindrical shape in cross section, substantially as shown.

5. In a fishing device, the combination of a strand of wire having a loop at each end, bosses on its central portion, a plurality of means affixed to said bosses and extending at right angles to the same, a plurality of hooks, a plurality of L-shaped plates having apertures at the ends by which they are swingably mounted on the aforesaid means, said plates also having apertures in the other ends to detachably receive the shanks of the fish hooks, and a coil of wire encircling each of the plates and detachably engaging the shank of a fish hook.

6. In a fishing device, the combination of a strand of wire having a loop at each end, bosses on its central portion, a plurality of U-shaped wires having their ends affixed to said bosses and extending at right angles to the wire, a plurality of fish hooks, a plurality of L-shaped plates having apertures at the ends by which they are swingably mounted on the aforesaid U-shaped wires, each of said plates also having an aperture in its bent end to detachably receive a fish hook, and a coil of wire encircling each plate and detachably engaging the shank of the fish hook, the fish hooks having V-shaped bends in their shanks.

COLIN R. PARKER.